Nov. 28, 1967     E. A. MEYER     3,354,597
ADAPTER
Filed June 14, 1966     2 Sheets-Sheet 1
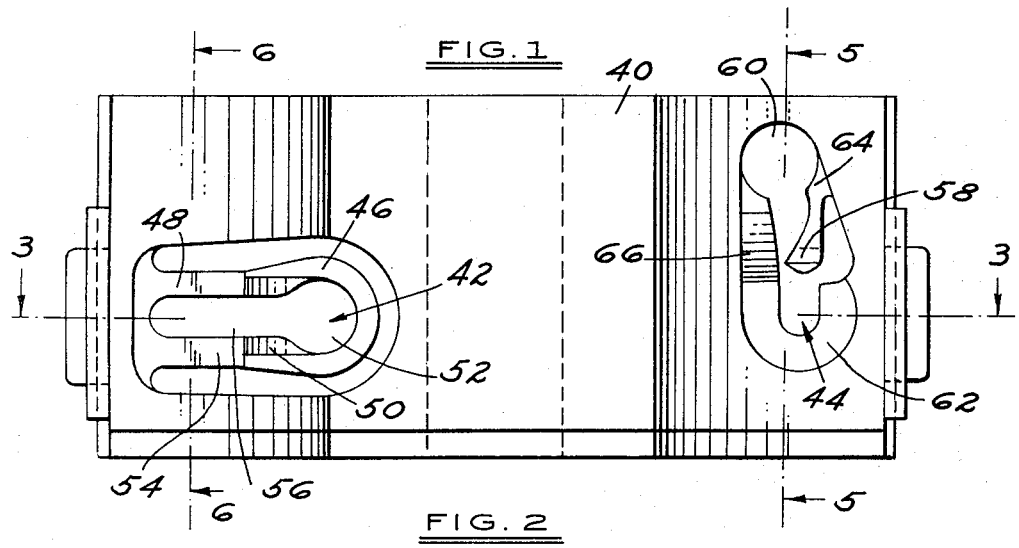
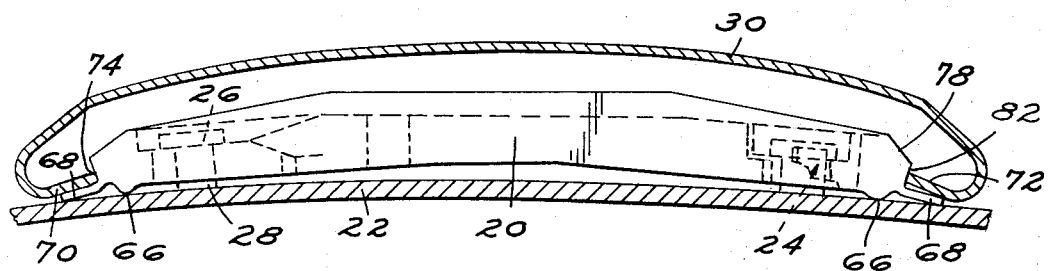
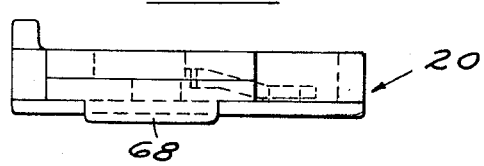
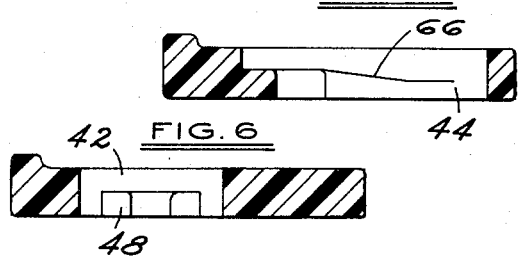
INVENTOR
ENGELBERT A. MEYER
BY
Burton & Parker
ATTORNEYS

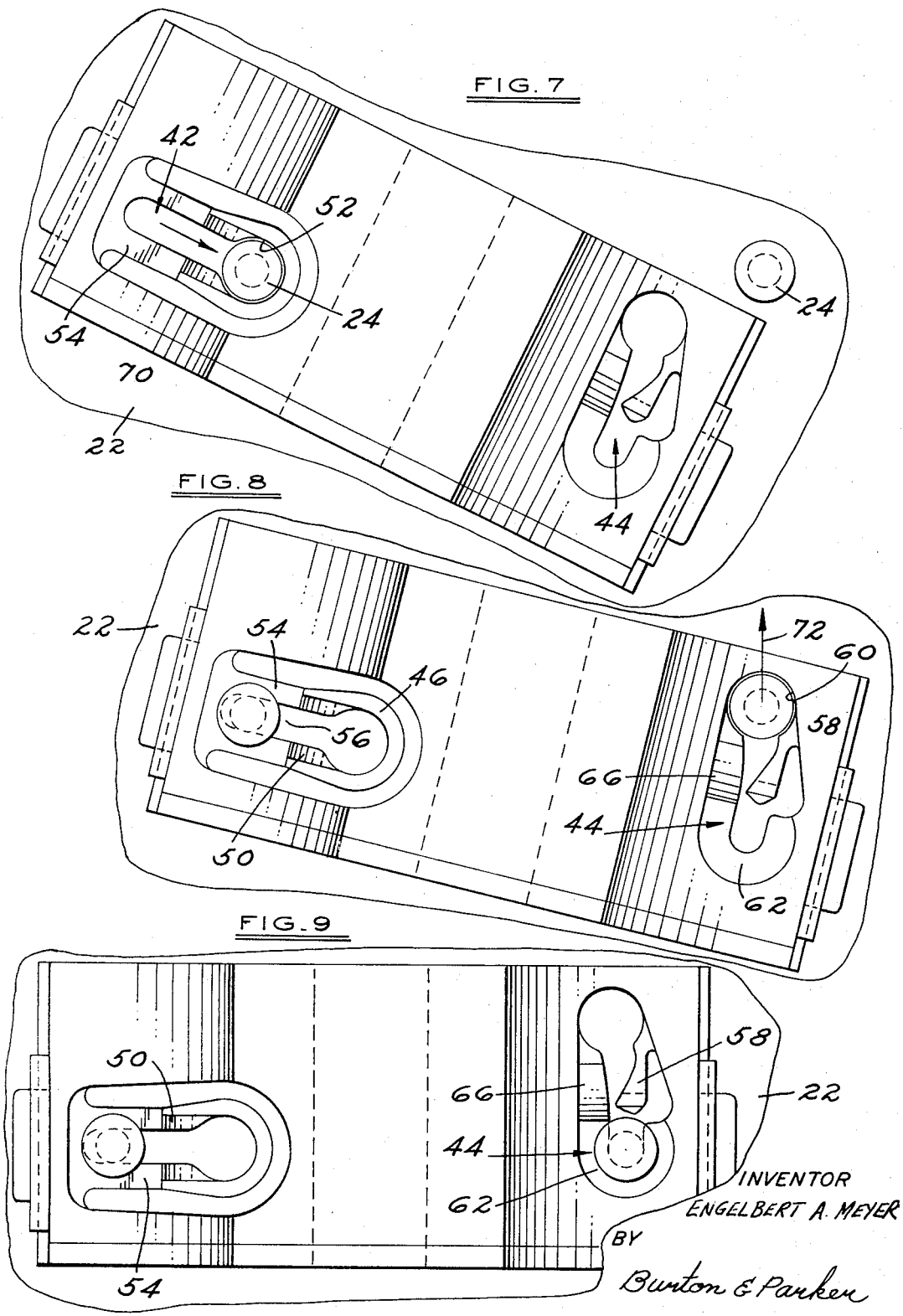

United States Patent Office 3,354,597
Patented Nov. 28, 1967

3,354,597
ADAPTER
Engelbert A. Meyer, Union Lake, Mich., assignor to Warren Fastener Corporation, Mount Clemens, Mich., a corporation of Michigan
Filed June 14, 1966, Ser. No. 557,577
11 Claims. (Cl. 52—718)

This invention relates to an improved molding assembly, adapter and method of assembly. More particularly, this invention relates to an improved molding assembly having an adapter which serves to interconnect a comparatively wide molding device to a support in overlying relation.

Molding assemblies are used in the manufacture of automobiles, refrigerators, and the like to meet functional and design requirements.

Preferably, the buttons are attached to a support in accordance with the method described in my United States Letters Patent No. 3,153,468, wherein the button is welded to steel or adhesively secured to various materials including steel, thereby eliminating the corrosion problems inherent in previously used techniques requiring a hole through the support. A series of spaced buttons for a single longitudinal molding device may be applied in a gang operation with accurate alignment.

A suitable size of button, presently used in automotive manufacture, involves a button which is 0.200 inch in diameter at its head end, 0.160 inch in height; the shank of the button being slightly greater than one-half the diameter of the head. Utilization of this new concept of trim attachment in the automative field provides substantial economies and advantages over previous methods. Similar economies and advantages are obtained in other fields, such as home appliances, refrigerators, stoves and the like.

The instant application will be described in the context of an automotive molding assembly.

The adapter of this invention was designed to meet a particular design requirement; that of attaching a comparatively wide molding device over a support, without the use of fasteners which extend through the support. Conventional "wide" molding assemblies include an adapter having an aperture at either end which receives a fastener secured through the support. The fastener extends through the apertures and secures the adapter. This structure is no longer commercially acceptable in view of the advances in weld on fasteners.

A problem in the design of this structure results from the fact that the button of the weld on fastener assembly is attached prior to the adapter and the trim, and the adapter in a "wide" molding assembly requires at least two buttons for adequate support of the molding. Thus, the adapter must be releasably secured to at least two spaced fixed buttons, and positively secure the molding under vibration and shock forces.

The adapter of this embodiment of my invention has a pair of spaced angularly related keyhole slots terminating in a button seat. Each of the keyhole slots is adapted to receive a button which has been previously secured to the support. Each keyhole slot has an inclined ramp portion, so that the adapter is tensioned against the support as the adapter is shifted to seat the button on the button seat thereby limiting the effect of vibration and other forces. The adapter has a pair of longitudinal base portions adapted to be tensioned against the support.

On the assembly line, the adapter is connected to a pair of buttons by receiving the aperture of the first keyhole slot over the enlarged head of the first button and shifting the adapter to seat the button in the slot portion. The adapter is then pivoted about the button seat toward the second button and simultaneously pivoted away from the support to allow receipt of the aperture of the second keyhole slot over the enlarged head of the second button. The slot portion of the second keyhole slot may lie substantially in an arc generated from the button seat of the first keyhole slot, so that the second button may be seated in the second keyhole slot as the adapter is pivotally shifted.

The adapter of this embodiment of my invention has laterally extending nonmetallic fins to provide insulation against electrolytic corrosion of the metal parts, and to resiliently tension the adapter seat against the button head. The fins are, in the completed assembly, sandwiched between the molding device and the surfce of the automotive support.

The above-described assembly provides a reliable and relatively inexpensive means of securing a relatively wide molding device over a support, which is not subject to corrosion, and which requires only one adapter.

Other objects, advantages and meritorious features will more fully appear from the following specification, claims and accompanying drawings, wherein:

FIG. 1 is a top elevation of one embodiment of the adapter of this invention;

FIG. 2 is a side view of the molding assembly using the adapter of FIG. 1;

FIG. 3 is a side cross sectional view of the adapter shown in FIG. 1, in the direction of view arrows 3—3;

FIG. 4 is an end view of the adapter shown in FIG. 1;

FIG. 5 is an end cross sectional view of the adapter shown in FIG. 1, in the direction of view arrows 5—5;

FIG. 6 is an end cross sectional view of the adapter shown in FIG. 1, in the direction of view arrows 6—6; and FIGS. 7 to 9 are top views of the adapter and button assembly, illustrating the method of assembly of the adapter.

In FIGS. 1 to 6 I have shown an embodiment of the molding assembly of this invention, and details of the adapter 20 of this assembly. The molding assembly, shown in FIG. 2, comprises a support 22, a pair of spaced buttons 24, a hollow molding device 30, and an adapter 20 interconnecting the molding device to the support. The support may be an automotive body panel, refrigerator housing, or the like. The buttons 24 have a shank portion 28 which may be secured to the support in accordance with the method described in my above-referenced patent, and have an enlarged head portion 26 spaced from the plane of the support.

The adapter 20 has a body portion 40 provided with a pair of spaced angularly related keyhole slots 42 and 44. The first keyhole slot 42 is defined in a U-shaped tongue portion 46 resiliently joined to the body portion 40 at its arms 48. An inclined ramp 50 is provided between the aperture 52 of the keyhole slot and the button seat 54 defined adjacent the slot portion 56. The adapter is thereby biased toward the support as the adapter is shifted to seat the button on the button seat 54.

The second keyhole slot 44 is substantially perpendicular to the first keyhole slot 42. The keyhole slot 44 of this embodiment of my invention is defined along an arc generated from the button seat 54 of the first keyhole slot. The second keyhole slot is provided with an inwardly extending finger 58 which restricts the communication between the keyhole aperture 60 and the button seat 62. The finger 58 is resiliently joined to the body portion 40 of the adapter at 64, and slants inwardly at an acute angle with the slot from adjacent the keyhole aperture 60. Thus, the finger may be easily biased out of its restricted position as the adapter is shifted to seat the button on the button seat 62, but will inhibit withdrawal of the button from its seat. The second keyhole slot also has an inclined ramp 66 which biases the adapter toward the support as the button is seated on the button seat 62.

The base of the adapter is provided with a pair of longitudinally extending bases 66, which provide a frictional face-to-face engagement of the adapted with the support when the adapter is biased toward the support. This engagement prevents detachment of the adapter under vibrational and other forces. The body of the adapter is provided with a pair of downwardly extending fins 68 which are biased against the support to extend substantially coplanar with the bases, as shown in FIG. 2.

The hollow molding device 30 is a longitudinally extending hollow channel having oposed inturned longitudinal flanges 70 and 72, as shown in FIG. 2. The configuration of the molding device is optional, and will depend upon its design and functional requirements. On installation, one of the molding flanges 70 may be moved into the longitudinal groove 74 on the side of the body portion 40. The other inturned flange 72 of the molding is then pressed against the tapered side 78 of the body to expand the molding device. The flange 72 may then be moved past the vertical side wall and will spring into the groove 82 on the opposite side of the body. In the assembled position, the tapered walls 74 and 82 of the adapter extend to overlie the inturned flanges of the molding device to inhibit removal of the molding. It will also be noted that the nonmetallic fins 68 extend laterally of the body to serve as insulation against electrolytic corrosion between the molding and the support; the fins 44 being sandwiched therebetween as shown in FIG. 2. This arrangement spaces the molding device from the automotive support, thereby allowing intercirculation of the molding device in the portions between the adapters to evaporate moisture and inhibit corrosion.

FIGS. 7, 8 and 9 illustrate a method of attaching the adapter embodiment disclosed in FIGS. 1 to 6 to a support. The support has a pair of spaced headed buttons 24 previously secured thereto. The aperture 52 of the first keyhole slot 42 of the adapter is received over the enlarged head of the first button, as shown in FIG. 7. The adapter is then shifted in the direction of the arrow 70 to seat the button head ont he button seat 54, adjacent the slot portion 56, as shown in FIG. 8.

The adapter is then pivoted about the button seat 54 toward the second button, in the direction of the arrow 72. It can be seen from FIG. 8 that this embodiment of the adapter must be simultaneously pivoted away from the support to receive the aperture 60 of the second slot 44 over the enlarged head of the second button. The resiliency required to allow this motion is provided by the U-shaped tongue portion 46, which is resiliently joined to the body portion 40 at its arms.

The adapter may now be further shifted along the arc 72 to seat the second button head on the button seat 62 of the second keyhole slot, as shown in FIG. 9. It can be further seen from FIG. 8 that the path of the button along the arc 72 intersects with the finger 58, and that the finger will present little resistance to seating of the button on the button seat 62, but will provide substantial resistance to removal of the button from the button seat.

The adapter of this embodiment of my invention provides for substantial variances in the distance between the buttons, while assuring a firm connection of the adapter to the support. As described hereinabove, the adapter is tensioned against the support by the inclined ramp portions of the keyhole slots 50 and 56. After the adapter is seated, as shown in FIG. 9, the slot portion of the second keyhole slot 44 prevents removal of the first button from the first button seat 54. However, the button seat 54 is comparatively long to provide for substantial variations in the distance between the buttons. Further, as explained hereinabove, the finger 58 prevents accidental unseating of the second button. Thus, the seating of the adapter will not be effected by vibrational or other forces encountered in automotive applications.

While various materials may be used for all parts of the assembly, the automotive industry utilizes metal primarily for the automotive support and the molding device. Steel is primarily used for the automotive support, with stainless steel being used for the button as well as cold rolled zinc plated steel. The buttons are stud welded to a prefabricated automotive support, before painting, or at least before final finishing, in a predetermined orientation. After cleaning, coating, and polishing, the automotive support is ready to receive the adapter. Preferably, the adapter is made of a nonmetallic resilient material to provide the electrolytic corrosion barrier described, and provide the resiliency required for assembly. A suitable material for the adpter is a thermoplastic resin, such as fiber-filled nylon, polycarbonates, acetal resins, and polypropylene.

While the molding assembly, adapter, and method of assembly has been described with reference to certain configurations and arrangements of keyhole slots, it is understood by those skilled in the art that various modifications may be made to the embodiment disclosed, and the method of assembly, without departing from the purview of the appended claims or the invention as disclosed herein.

What is claimed is:

1. An adapter for attaching a hollow molding device to a support having an outer surface with a pair of spaced buttons attached thereto, said buttons having an enlarged head portion spaced from the plane of the support, comprising: a body having a pair of spaced generally perpendicularly related keyhole slots each terminating in a button seat adapted to be received beneath the head portions of said buttons, at least one of said keyhole slots having a restricted communication between the button seat and the keyhole aperture to inhibit withdrawal of the button from its seat.

2. The adapter defined in claim 1, characterized in that one of said keyhole slots is defined substantially along an arc generated from the button seat of the other of said keyhole slots.

3. The adapter defined in claim 1, characterized in that one of said button seats is resiliently joined to said body.

4. An adapter for attaching a hollow molding device to a support having a pair of spaced buttons attached to the outer surface thereof, said buttons having an enlarged head portion spaced from the plane of the support, comprising: a body portion having a pair of spaced substantially perpendicularly related keyhole slots, each slot terminating in a button seat adapted to be received beneath and tensioned against the head portion of a button.

5. The adapter defined in claim 4, characterized in that one of said keyhole slots is defined in a U-shaped tongue portion resiliently joined to said body portion.

6. The adapter defined in claim 5, characterized in that the other of said keyhole slots is defined substantially along an arc generated from the button seat of said one of said keyhole slots.

7. The adapter defined in claim 4, characterized in that said keyhole slots have an inclined ramp portion between the opening of the keyhole slot and said button seat adapted to bias said adapter body toward the support as the adapter is shifted to seat the button on the button seat.

8. The method of attaching a hollow molding device to a support in overlying relation, including: securing a pair of buttons in spaced relation to a support each having an enlarged head portion spaced from the plane of said support, connecting an adapter having a pair of generally perpendicularly related keyhole slots each terminating in a button seat to the first of said buttons by receiving the aperture of the first of said keyhole slots over the enlarged button head of said first button, shifting the adapter to seat the button over the slot portion of said key hole slot in said seat, pivoting said adapter about the button seat of said first keyhole slot toward the second of said buttons and seating said second button in the second keyhole slot.

9. The method of attaching a hollow molding device to a support in overlying relation defined in claim 8, wherein said adapter is pivotally shifted away from the support simultaneously with the pivotal motion of said adapter toward said second button to allow receipt of the aperture of said second keyhole slot over the enlarged head of said second button.

10. The method of attaching a hollow molding device to a support defined in claim 9, wherein the slot portion of said second keyhole slot lies substantially in an arc generated from the button seat of said first keyhole slot, and the adapter is shifted in said arc to seat said second button in said slot portion.

11. The adapter defined in claim 4, in combination with a hollow molding device secured to opposed lateral edges of said adapter, characterized in that the axis of said molding device is generally parallel to the axis of one of said keyhole slots to resist lateral motion of the molding, and the axis of the other keyhole slot is generally perpendicular to the axis of said molding device to resist longitudinal motion of said molding.

References Cited

UNITED STATES PATENTS

| | | | |
|---|---|---|---|
| 2,358,890 | 9/1944 | Tinnerman | 85—36 |
| 2,596,332 | 5/1952 | Flora et al. | 24—73 |
| 2,930,459 | 3/1960 | Moser | 52—717 |
| 3,154,825 | 11/1964 | Edelberg et al. | 24—73 |
| 3,239,988 | 3/1966 | Meyer | 52—718 |

FRANCIS K. ZUGEL, *Primary Examiner.*